Jan. 15, 1963   J. ROSSELET   3,073,241
SAFETY DEVICE FOR THE FUZE OF A GYRATING MISSILE DURING FLIGHT
Filed Oct. 20, 1959   9 Sheets-Sheet 1
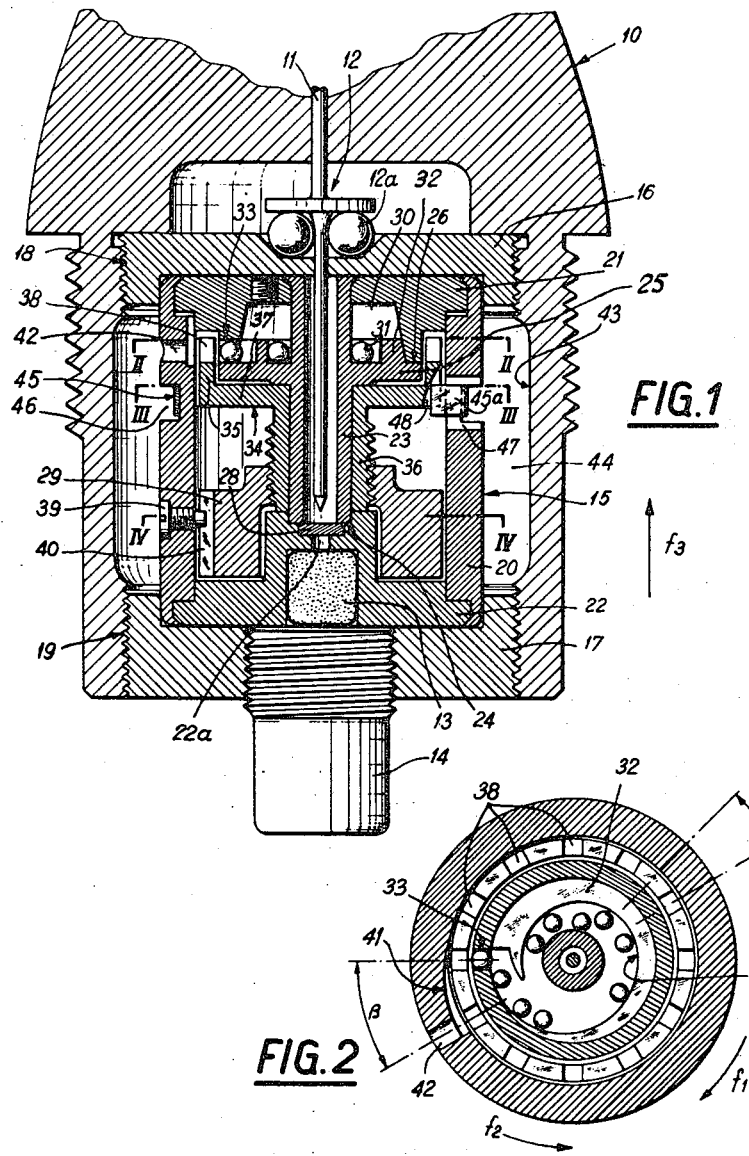

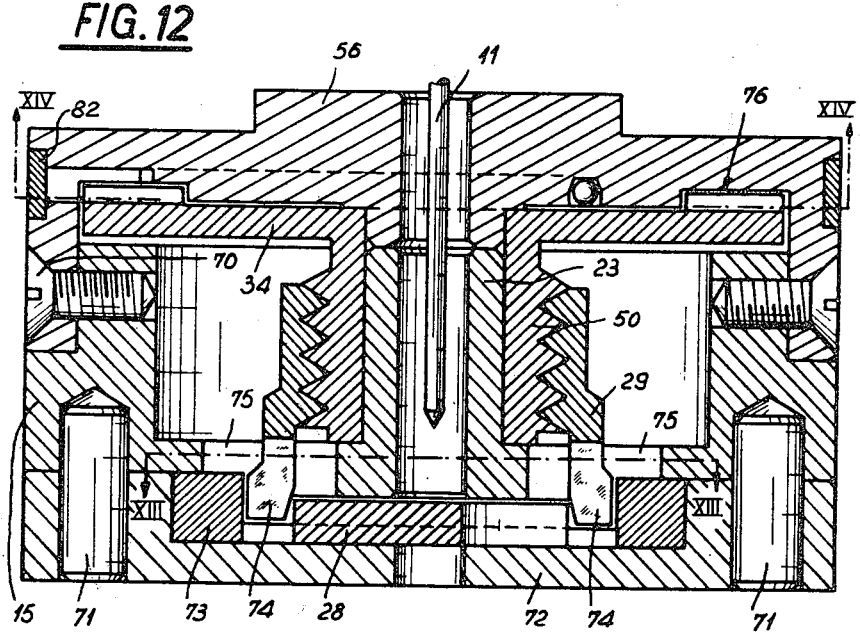
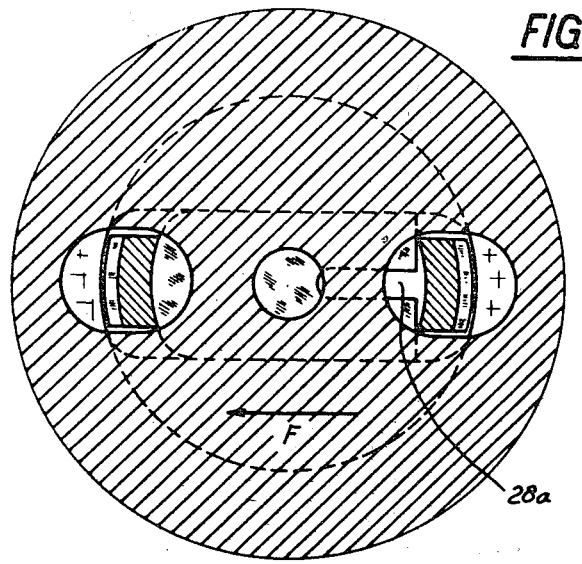

Jan. 15, 1963  J. ROSSELET  3,073,241
SAFETY DEVICE FOR THE FUZE OF A GYRATING MISSILE DURING FLIGHT
Filed Oct. 20, 1959  9 Sheets-Sheet 8

$\beta_2 = \beta_1$ $\beta_2 < \beta_1$ 3,073,241
SAFETY DEVICE FOR THE FUZE OF A GYRATING MISSILE DURING FLIGHT
Jean Rosselet, Geneva, Switzerland, assignor to Etablissement Valerca, Vaduz Liechtenstein, a firm of Liechtenstein
Filed Oct. 20, 1959, Ser. No. 847,558
Claims priority, application Switzerland Oct. 20, 1958
5 Claims. (Cl. 102—79)

The present invention has for its object a safety device for the fuze of a gyrating missile during flight, i.e. an arrangement preventing any untimely priming of the fuze during a predetermined period following the starting of the missile on its path.

According to the invention, the arrangement comprises, on the one hand, a mechanism, including a member rigid with the body of the fuze, a wheel, the rotary axis of which registers with that of the fuze and balls escaping in succession under the action of centrifugal force through passageways formed by the grooves cut in said member and in said wheel, so as to make the wheel turn by a predetermined angle and, on the other hand, by means preventing the setting of the fuze up to the time the wheel reaches a predetermined angular position.

The accompanying drawings illustrate by way of example various embodiments of the object of the invention. In said drawings:

FIG. 1 is an axial cross-section of an embodiment of a fuze embodying the invention.

FIGS. 2 to 4 are cross-sections through lines II—II, III—III and IV—IV of FIG. 1 respectively.

FIGURE 9 is a cross-section taken on line IX—IX of FIGURE 8.

FIG. 12 is an axial cross-sectional view of a fifth embodiment.

FIGS. 13 and 14 are cross-sections through line XIII—XIII and XIV—XIV of FIG. 12.

FIGS. 16 to 18 are diagrams illustrative of the various shapes which may be provided for the grooves while

Figure 3:
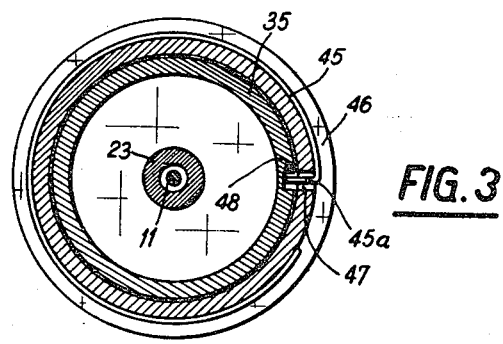
Figure 4:
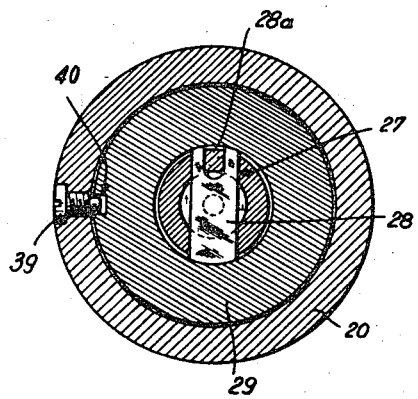

In the arrangement illustrated in FIGS. 1 to 4 as fitted in the body of the fuze 10, 11 designates the striker, 12 a ball system holding the latter in its inoperative position, 13 the primer, 14 the detonator. The means preventing any untimely priming of the fuze are constituted by the transversely sliding bolt 28. The arrangement according to the invention includes a casing 15 held fast inside the tube body between the two threaded plugs 16, 17 screwed into corresponding tapped bearings 18 and 19 provided in the bottom and the input end of the cylindrical recess in which the arrangement is housed inside the fuze.

The casing 15 includes a cylinder 20 closed at both ends by flanges 21 and 22, respectively, between which is fitted a tube 23 guiding the striker 11. Said tube 23 bears through its lower end against a shoulder 24 formed on the flange 22 and through the upper periphery of its collar 25 against the edge 26 of a dished member, of which the flange 21 forms a part, the edge of the dished member facing inwardly of the fuze, so as to engage the collar 25.

The system including the dished member or flange 21 and the tube 23 is fitted on the cooperating system including the flange 21 and the cylinder 20.

The flange 22 is provided on its underside with a central recess housing the primer 13 and on its upper side with a boss in which is cut a diametrical groove 27 (FIG. 4) slidably housing the bolt 28, said recess being connected with the diametrical groove through an axial passage 22a extending through the wall of the flange 22. The bolt 28 is held against diametrical shifting by a nut 29, the lower projecting periphery of which encloses the projecting boss of the flange 22 carrying the bolt 28.

The dished member or flange 21 defines with the collar 25 a chamber 30 in which is housed a plurality of metal balls 31. In contact with the inner wall of the chamber, there is fitted an annulus 32, of which the inner periphery 32a forms a spiral-shaped slope, the outer end of which merges into a port 33 (FIG. 2) cut in the side wall of the dished member 21 and the cross-section of which is sufficiently large to allow the passage of the ball through it.

The arrangement described includes furthermore a wheel 34 revolving round a spindle constituted by the section of the tube 23 located underneath the collar 25. The rim 35 of said wheel is connected with the threaded hub 36 by means of an annular web 37 and is provided with a series of radial grooves or notches 38 (FIG. 2), the cross-section of which is slightly larger than the diameter of the balls and which extend throughout the rim. The rim is fitted inside an annular gap extending between the outer periphery of the collar 25 and the inner periphery of the upper section of the cylinder 20. The notches 38 in the wheel register horizontally with the ports 33 opening into the chamber 30.

Over the threaded hub 36 is screwed the above-mentioned nut 29 which is held fast against rotation by a radial screw 39 terminating with a stud engaging a longitudinal groove 40 cut into the cylindrical periphery of the nut. Thus, the screw 39 passing through the wall of the cylinder 20 does not prevent the nut 29 from being shifted axially.

At the level of the notches 38, the inner periphery of the cylinder 20 is provided with a spiral-shaped slope 41 (FIG. 2) extending over an arc β. A radial opening 42 extending throughout the wall of the cylinder 20 opens into the terminal section of said slope and its cross-section is substantially equal to that of the port 33.

Between the two plugs 16 and 17, the body of the fuze is provided with a broad annular groove 43 defining a container 44 with the outer periphery of the cylinder 20.

The arrangement described is locked before the starting of the missile by a slotted ring 45 fitted inside an annular groove 46 formed in the outer surface of the cylinder 20. The inturned nose 45a of the ring engages a radial slot 47 formed in the groove 46 and, beyond the latter, a cut 48 formed in the wheel 34 (FIG. 3). The ring 45 not only prevents the latter from rotating when the fuze is being handled, but it also defines accurately the angular starting position of the wheel.

The operation of the arrangement begins when the missile has reached a sufficient speed of gyration, for which the ring 45 urged centrifugally outwardly against the bottom of the groove 43 releases the wheel 34.

At this moment, the balls 31 are urged centrifugally against the slope 32a which guides them in the direction of the arrow $f1$ (FIG. 1) towards the output port 33. One of the balls then enters the port and engages a notch 38 registering with the port, so that it finally lies in contact with the spiral surface of the slope 41 and exerts a radial force onto this surface, the reaction of which includes a tangential component which is transmitted by the ball to the wheel, so as to produce a torque which makes the wheel revolve in the direction of the arrow f2 (FIG. 2) while the ball rolls over the spiral surface.

The ball engaging, on the one hand, the spiral surface of the slope 41 and, on the other hand, the surface of the notch 38, the movement thus initiated continues until the ball has passed through the notch 38 and, having swept over te stationary surface 41, drops through the opening 42 into the container 44. The wheel then stops momentarily.

During rotation, a second notch 38 registers with the outlet port 33 and a second ball 31 enters the position originally occupied by the first ball. The arrangement is thus in the same condition as that prevailing at the moment of the starting of the wheel into rotation. Consequently, the second ball follows the same path as the first ball and makes the wheel progress by a further angle β before it drops in its turn into the container 44.

The intermittent procedure continues in a uniform manner, the successive balls producing successive rotations of the wheel by an angle β before they drop into the container 44 in which the preceding balls have already dropped.

This rotation of the wheel 34 has for its consequence a screwing of the nut 29 over the hub 36 and an axial shifting of the nut in the direction of the arrow f3. When the nut has executed a predetermined axial movement, it uncovers the ends of the bolt 28. Under the action of centrifugal force, the bolt is thus free to move radially, which brings its notch 28a into registry with the axis of the striker so that said striker is consequently ready for operation.

Figure 5:
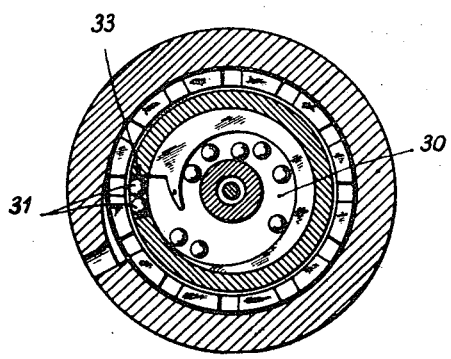
FIG. 5 is a cross-section view corresponding to FIG. 2 of a modification.

FIG. 5 illustrates a modification of this first embodiment according to which the dished member 30 is provided with a port 33 which is twice as wide as the corresponding port in the first embodiment, to allow two balls 31 to engage it simultaneously, which increases the reliability in operation of the arrangement.

Figure 6:
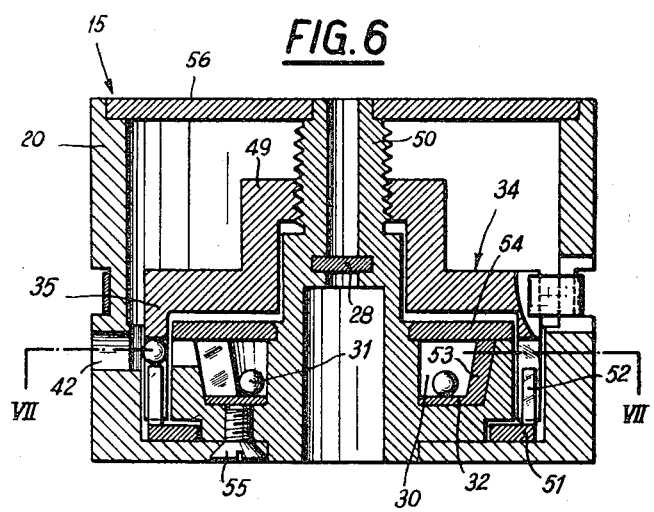
FIGS. 6 and 7 are two cross-sections, respectively through line VI—VI of FIG. 7 and through line VII—VII of FIG. 6.
Figure 7:
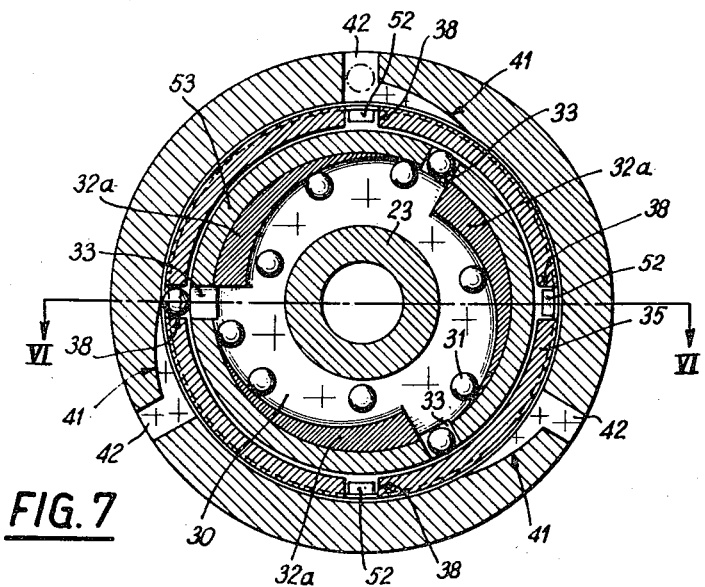

The arrangement illustrated in FIGS. 6 and 7 differs chiefly from the first embodiment through the fact that three ports 33 are provided, through which the balls may escape out of the central chamber 30, while the member moving axially under the action of the rotation of the wheel 34 to allow the bolt 28 to recede under the action of centrifugal force is constituted by a section of the actual wheel.

The wheel 34 is, as a matter of fact, constituted by two separate sections, one of which is formed by a tapped bell-shaped member 49 screwed over a threaded bearing 50 on the guiding tube 23, while the other section forms a ring 51 bearing against the bottom of the cylinder 20. The surfaces guiding the balls during their passage through the wheel are constituted by the lateral walls of four vertical notches 38 cut in the rim 35 of the wheel section 49 and the terminal surfaces of the tongues 52 formed on the ring 51 and engaging freely the notches 38.

The inner chamber 30 is formed inside a cup-shaped or dished member 53 rigid with the tube 23 in proximity with its lower end and by an annulus 54 fitted over the body of said tube 23. The dished member is secured eccentrically by a screw 55 to the bottom of the cylinder 20 which is closed at its upper end by a circular cover 56 driven with a hard fit over the end of the tube 23.

The inner side wall of a further annulus 32 fitted inside the dished member 53 forms three spiral slopes 32a opening into registry with the three ports 33 respectively. Since the bottom of the dished member 53 does not lie at the same level as the surface guiding the wheel, the slopes 32a extend slightly over a conical surface, so that the balls may be urged centrifugally against the annulus 54.

The operation of this arrangement is similar to that of the first embodiment, except for the fact that the successive balls do not act on the same slope 41, but are distributed over three slopes, the lengths of which are such that when a ball 31 engages the wheel, another ball escapes into the outer container through one of the ports 42.

Under the action of the balls passing through the wheel, the tapped section 49 of the latter is screwed over the threaded bearing 50. When said tapped section has travelled over a sufficient axial length, its cylindrical part enclosing at the start the central section of the tube 23 housing the bolt 28 releases the latter, which is urged outwardly under the action of centrifugal force.

Figure 8:
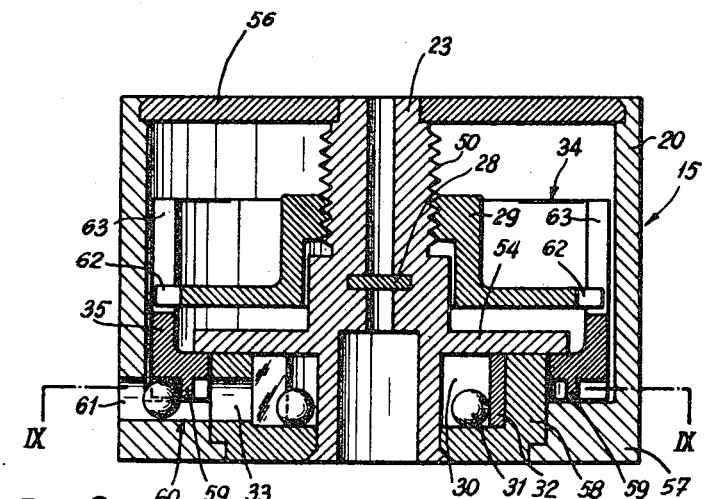
FIGS. 8 and 9 are cross-sections, corresponding to FIGS. 6 and 7, of a third embodiment.
Figure 9:
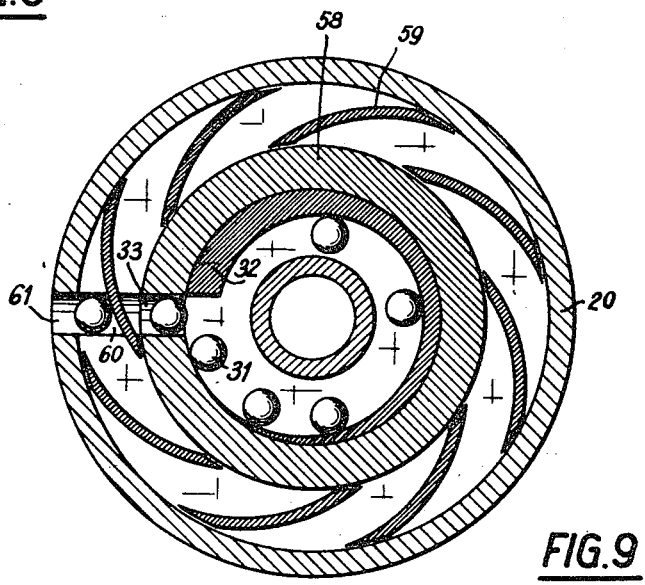

The embodiment illustrated in FIGS. 8 and 9 includes, as in the case of the preceding arrangement, a casing 15 constituted by a cylinder 20 provided with a bottom 57 and the upper end of which is closed by a circular cover 56, a guiding tube 23, a ball-containing chamber 30 formed between a collar 54 on the tube 23 and a cup-shaped member 58 fitted over the lower end of the tube 23, while a ring 32, the inner periphery of which is in the shape of a spiral, is adapted to guide the balls 31 inside the chamber 30 towards the single outlet port 33 formed in the cup-shaped member 58. The surfaces guiding the balls during their passage through the wheel are constituted by the inner surfaces of spiral-shaped fins 59 projecting beyond the lower annular surface of the wheel 34 and by the surface of a groove 60 of a semi-circular cross-section extending radially across the upper surface of the bottom 57 of the cylinder 20 in alignment with the outlet port 33 in the member 58. The wheel 34 revolves around the upper part of the outer periphery of the cup-shaped member 58 and its axial clearance is bounded, on the one hand, by the edge of the collar 54 on the tube 23 and, on the other hand, by the upper surface of the bottom 57 of the cylinder 20. The height of the fins 59 and the radius of the groove 60 are slightly larger than the radius of the balls 31.

When a ball 31 reaches the opening 61 in the cylinder wall and drops through the latter into the container formed in the fuze body, the ball has caused the wheel to revolve by one elementary angle, so that the next fin 59 is now in registry with the port 33 and is engaged by the following ball.

The nut 29 screwed as precedingly over a threaded bearing on the tube 23 and the cylindrical depending section of which surrounds the tube housing radially the bolt 28, is driven by two studs 62 rigid with said nut and engaging two vertical notches 63 cut in the rim 35 of the wheel 34. The bolt 28 is released as in the preceding embodiments as soon as the wheel controlling the nut has executed a predetermined angular movement constituted by a plurality of elementary angles.

Figure 10:
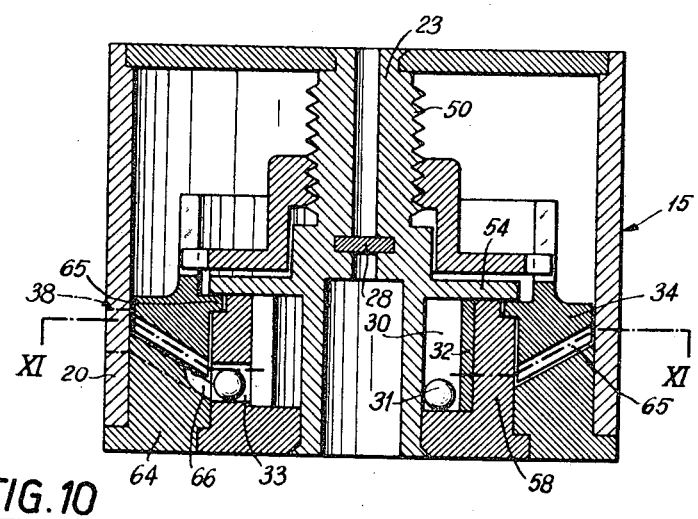
FIGS. 10 and 11 are cross-sections of a fourth embodiment and FIG. 11 is taken on line XI—XI of FIG. 10.
Figure 11:
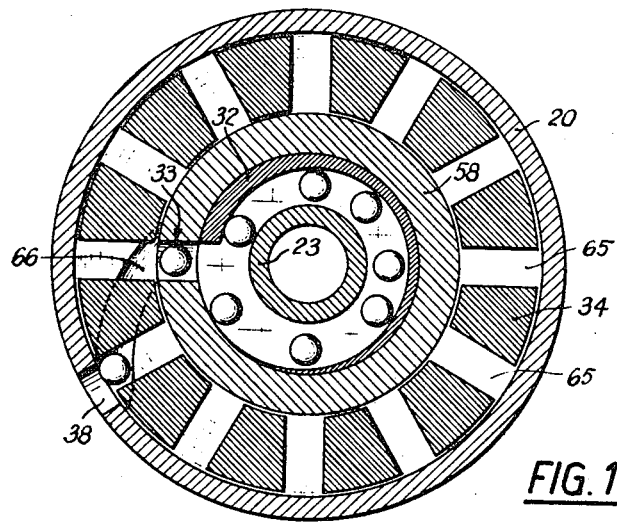
Figure 15:
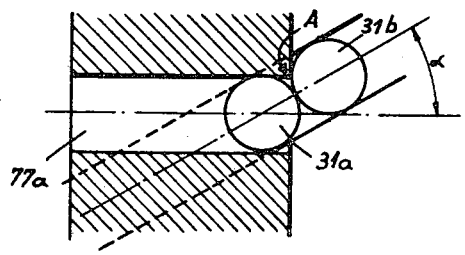
FIG. 15 is an explanatory view on a larger scale.

The arrangement illustrated in FIGS. 10 and 11 comprises the same parts heretofore described namely, the casing 15, a central tube 23, an inner chamber 30 bounded by the collar 54 on the tube and a cup-shaped member 58 fitted over the lower end of the tube 23, a nut 29 screwed over the threaded bearing 50 on said tube, a bolt 28 and a guiding ring 32 inside the chamber 30.

The wheel 34 is provided with a frusto-conical lower surface resting on the correspondingly shaped surface of an annular member 64 fitted between the cylinder 20 and the cup-shaped member 58. The wheel 34 is held by its inner flange 65 inside an annular groove formed between the lower surface of the collar 54 and an annular shoulder on the outer periphery of the cup-shaped member 58.

In the frusto-conical surface forming the lower surface of the wheel are cut radial grooves 65 of a semi-circular cross-section, while the corresponding surface of the ring 64 is provided with a spiral-shaped groove 66 of a corresponding semi-circular cross-section.

When the ball leaves the container, it engages simultaneously a radial groove in the wheel and the spiral-shaped groove in the annular member 64. The ball is held during its passage through the wheel by the cooperating surfaces of said two grooves. The ball thus guided reaches the opening 38 in the cylinder 20 after it has made the wheel 34 rotate by an angle corresponding to the pitch or elementary angular shifting of the wheel, so that the ball lying then in the port 33 may register with the next radial groove when the first-mentioned ball drops into the container in the fuze body. In this last embodiment, the surfaces between which the balls are held assume a slope with reference to a plane perpendicular to the axis of the fuze, but they may as well be arranged horizontally, i.e. radially of the tube, as in the case illustrated in FIGS. 8 and 9.

Turning now to the embodiment illustrated in FIGS. 12 to 15, the frame of the arrangement is constituted by a cylindrical body 15 provided with a central tube 23 through which passes the striker 11, while an also cylindrical member 56 caps the cylindrical body 15 and is secured to the latter through the radially extending screws 70.

The lower surface of the bottom of the body 15 there is secured a plate 72 through the pins 71. The plate 72 is provided on the one hand, with an annular groove inside which is fitted a ring 73 and, on the other hand, with a diametrical cut housing the striker-locking bolt 28.

The tube 23 forms the pivot for a wheel 34 provided with a threaded hub 50. Over the thread is screwed a nut 29 including two depending sections 74 extending through corresponding openings 75 formed in the bottom of the cylindrical member 15. The extensions 74 lock the bolt 28 against movement through the ends of its housing.

Figure 14:
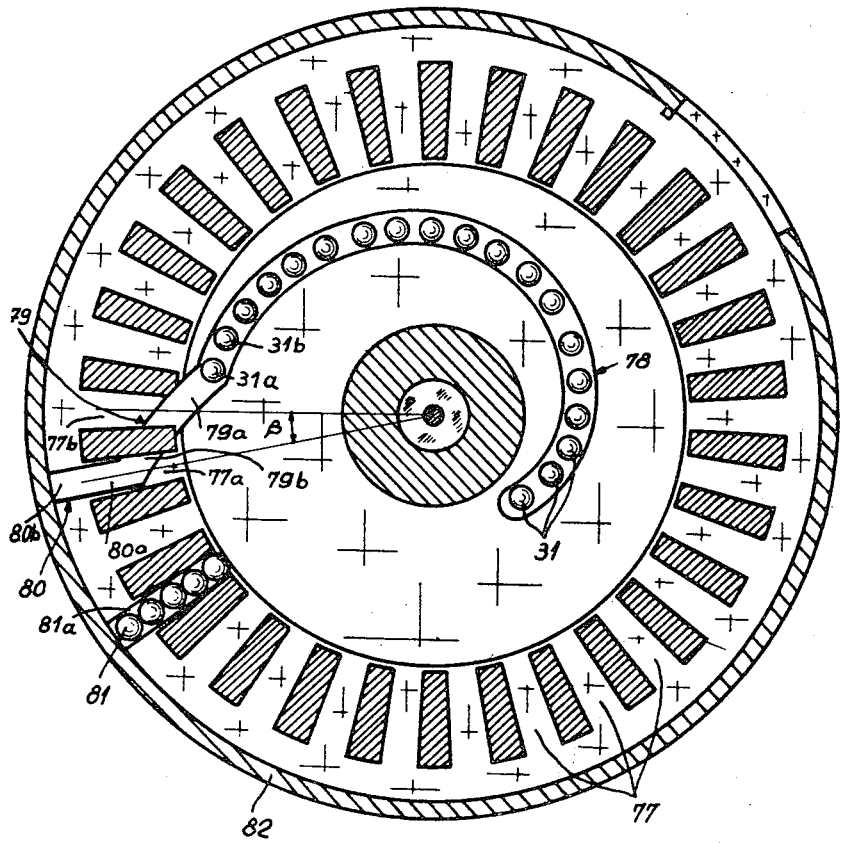

The lower surface of the covering member 56 is provided with an annular groove 76 inside which is fitted a projection of a corresponding shape rigid with the wheel 34. A number of radial cuts 77 are distributed throughout the periphery of this projection (FIG. 14). The lower surface of the covering member 56 is also provided with a groove including a spiral section 78, an incurved section 79 and a radial section 80 (FIG. 14). Balls 31 are housed in the section 78 which is closed by the upper surface of the web of the wheel 34.

The first part 79a of the section 79 forms a guide feeding the balls 31 under a predetermined angle into engagement with the wheel 34. The second part 79b of the section 79 and the first part 80a of the section 80 are adapted to form with the cuts or notches 77 in the wheel 34 passageways for the balls 31. The second part 80b of the section 80 forms the outlet opening of the arrangement.

Said arrangement includes furthermore a bolt defining the angular position of the wheel 34 with reference to the body of the arrangement, so as to prevent the latter from rotating before the missile has started on its path. The bolt is constituted, on the one hand, by a radial notch in the wheel 34, and, on the other hand, by a corresponding notch formed in the lower surface of the covering member 56. The notches forming together a housing for the balls 81 held in position by a yielding annular member 82, provided with a gap at a point of its periphery.

The operation of the arrangement is as follows: the missile having started, it begins revolving and the annular member 82 opens, so that the balls 81 escape centrifugally. During this time, the ball 31a has also been urged centrifugally into the passageway formed by the part 79b of the section 79 and by the notch 77a. It moves therefore along the end 79b of the section 79 and produces a rotation of the wheel by an angle β. As a consequence of the slope assumed by the input channel 79a the ball 31b following the ball 31a is prevented from also entering the notch 77a. As a matter of fact, it has abutted against the ridge A (FIG. 15) and it stops momentarily until the next notch 77b registers with it and allows it to pass through it. This occurs slightly before the first ball 31a has reached the end 79b of the section 79 because the angle having its apex at the center of the wheel and formed between two successive notches 77 is equal to β. When the ball 31a has reached the input end of the part 80a of the groove section 80, the ball 31b has partly engaged the passageway formed by the notch 77b and the part 79b of the section 79.

The ball 31a passes through the end 80b of the section 80 during the next time interval while the wheel 34 stops before it starts rotating again under the action of the ball 31b at 79b as soon as the ball 31a has escaped. The movement of the wheel 34 continues thus intermittently under the action of the successive balls which produce each an elementary rotation of said wheel through an angle β. During said movement, the nut 29 which cannot revolve is screwed over the thread 50. At a predetermined moment corresponding to a predetermined duration of flight of the missile, the extensions 74 on the nuts 29 have completely receded and release the bolt 28 which, under the action of centrifugal force, moves in the direction of the arrow F. The notch 28a of said bolt registers now with the axis of the striker 11, so as to allow the latter to impinge on the primer, as soon as the missile is subjected to a shock.

A simple calculation shows that the minimum value of the angle α (FIG. 15) preventing the ball 31b from following directly the ball 31a is equal to 30°.

Generally speaking, the time interval required for the wheel to reach the position for which the fuze may be set for ignition depends as will now be described on shape of the grooves. This time interval may be considerably increased by giving the grooves properly designed shapes.

As a matter of fact, we may examine the expression giving the torque C generated by a ball.

$$C = mr^2 w^2 \, \mathrm{tg} \, (\beta - \rho)$$

$m$ designating the mass of the ball, $r$ its distance from the axis of the fuze, $w$ its angular speed, $\beta$ the angle between the tangent to the groove at any point of the latter and a perpendicular to the vector $r$ at said point, and $\rho$ the frictional angle between the ball and the wall of the groove.

Figure 16:
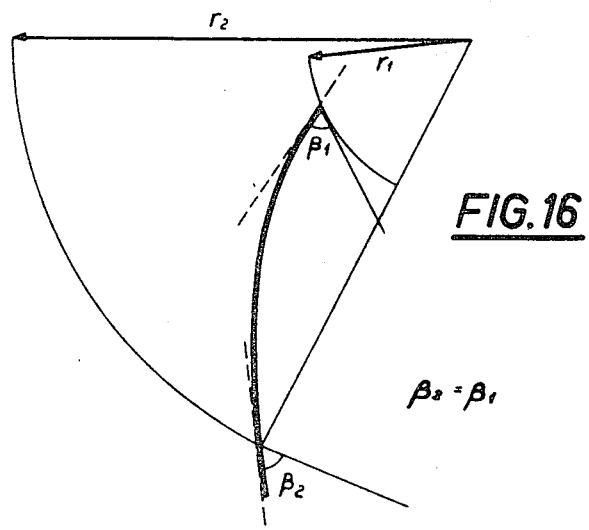
Figure 19:
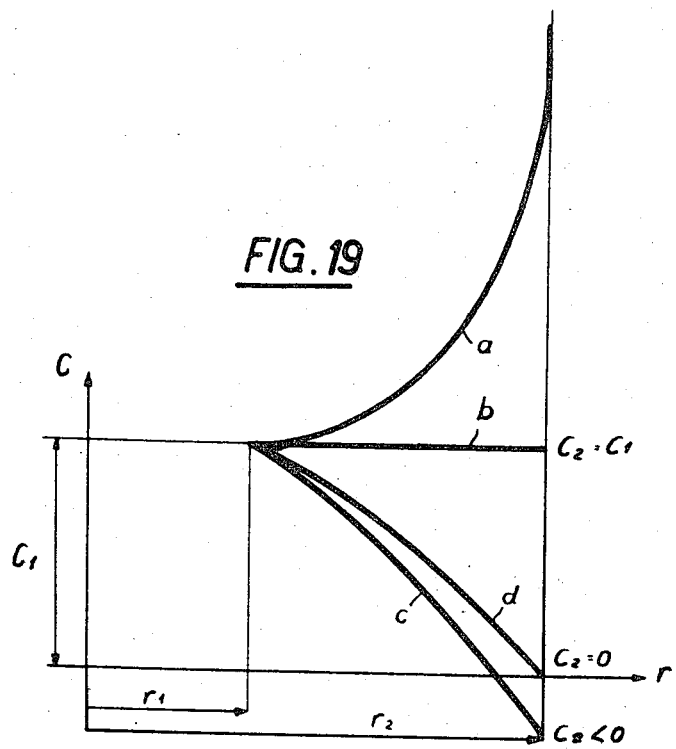
FIG. 19 is a diagram illustrating the torques developed by a ball in the cases illustrated in FIGS. 16 to 18.

Assuming the groove is spiral-shaped (as shown in FIG. 16), i.e. if β does not vary between the input and the output of the wheel $(\beta_1 - \beta_2)$, the torque C increases with $r^2$ since the factor $\mathrm{tg} \, (\beta - \rho)$ is constant, as illustrated by the curve $a$ of FIG. 19. In such a case, the time required for the rotation of the wheel by a predetermined angle is comparatively short.

Figure 17:
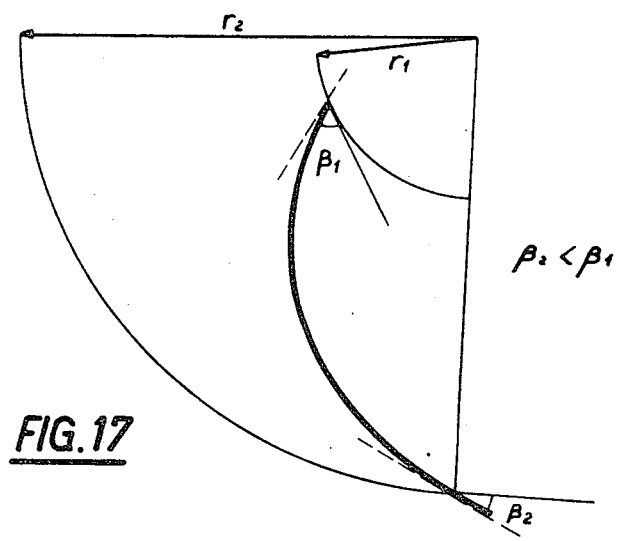
Figure 18:
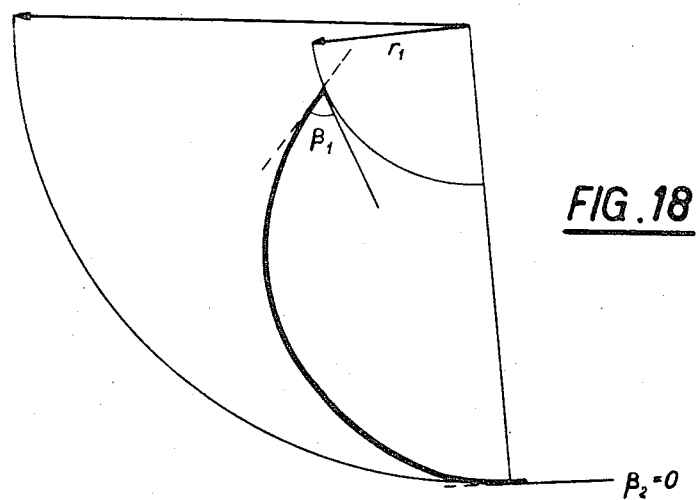

In the modified embodiment of the groove as illustrated in FIG. 17, the angle β varies in a manner such that the torque C remains constant $(C2 = C1)$ throughout the passage of the ball through the wheel as illustrated by the curve $b$ of FIG. 19. In FIG. 18, the angle β is designed in a manner such that the torque decreases constantly between $r1$ and $r2$ and it is in fact negative $(C2 < 0)$ at the end of said passage of the ball, i.e. starting from the moment where β is equal to or smaller than ρ as shown by the curve $c$ in FIG. 19. In both cases, it is obvious that the time interval considered is much longer than in the case of a spiral-shaped groove.

Similarly, with other shapes given to the grooves, it is possible to obtain other curves defining other modifications in the torque, for instance the curve for which the terminal value C2 is equal to zero.

It is obvious that the shapes of the grooves illustrated in FIGS. 17 and 18 may be considered, as a first approximation, as formed by arcs of a circle, so that they may, under such conditions, be machined in a very economical manner.

Obviously the arrangement according to the invention as defined in the accompanying claims is not limited to fuzes operating through percussion. It may for instance be applied as well to electrically operated fuzes which are fired by an electrical discharge; in this case, there is inserted for instance in the discharge circuit a switch the closing of which is obtained through a predetermined relative axial shifting of the nut and of the wheel.

What I claim is:

1. In a mechanical impact fuze for a spin stabilized missile having a primer, a firing striker extending axially of the fuze for striking said primer on impact of said missile, the improvement which comprises, a guided rotary member, means guiding said rotary member and having means cooperative with said rotary member for causing said rotary member to move axially between a preselected initial axial position and a second axial position upon rotation of said rotary member, a safety member disposed in a safety position transversely of said fuze axis disposed between said primer and striker to preclude striking of said primer by said striker, means mounting said safety member constructed to permit movement of said safety member radially in response to the spin of the missile into a position allowing said striker to engage said primer on impact, said rotary member having means effective for holding said safety member in said safety position when disposed in said preselected axial position and effective to release said safety member when moved to said second axial position upon rotation of said rotary member, a system for rotating said rotary member in one direction in response to missile spin to cause it to move axially to said second axial position, said system comprising a plurality of alike bodies disposed internally of said fuze and radially inwardly of said rotary member, said rotary member having a plurality of radial channels through which said bodies are capable of passing through radially outwardly, means guiding the bodies spirally radially outwardly in response to missile spin to guide said bodies successively into said channels, and means disposed radially outwardly of said channels providing at least one surface coactive with said rotary member and said bodies upon their moving radially outwardly successively through said channels configured to guide movement of said bodies radially outwardly and simultaneously around said axis each a limited angular extent and thereby impart rotational movement to said rotary member in a direction causing said rotary member to rotate and travel axially to said second axial position, the last mentioned means having a radial opening to allow said bodies to pass radially outwardly thereof, and means defining a chamber for receiving said bodies after they leave the last mentioned channel.

2. In a mechanical impart fuze for a spin stabilized missile having a primer, a firing striker extending axially of the fuze for striking said primer on impact of said missile, the improvement which comprises, a guided rotary member, means guiding said rotary member and having means cooperative with said rotary member for causing said rotary member to move axially between a preselected initial axial position and a second axial position upon rotation of said rotary member in a given direction, a safety member disposed in a safety position transversely of said fuze axis disposed between said primer and striker to preclude striking of said primer by said striker, means mounting said safety member constructed to permit movement of said safety member radially in response to the spin of the missile into a position allowing said striker to engage said primer on impact, said rotary member having means effective for holding said safety member in said safety position when disposed in said preselected axial position and effective to release said safety member when moved to said second axial position upon rotation of said rotary member, a system for rotating said rotary member in said given direction in response to missile spin to cause it to move axially to said second axial position, said system comprising a plurality of alike balls disposed internally of said fuze and radially inwardly of said rotary member, said rotary member having a plurality of radial channels equally spaced angularly, through which said balls are capable of passing through radially outwardly, means guiding the balls spirally radially outwardly in response to missile spin to guide said balls successively into said channels, and means disposed radially outwardly of said channels providing at least one surface coactive with said rotary member and said balls upon their moving radially outwardly successively through said channels configured to guide movement of said balls radially outwardly and simultaneously around said axis each a limited angular extent and thereby impart rotational movement to said rotary member in a direction causing said rotary member to rotate and travel axially to said second axial position, the last mentioned means having a radial opening to allow said balls to pass radially outwardly thereof, and means defining a chamber for receiving said balls after they leave the last mentioned channel.

3. In a mechanical impact fuze for a spin stabilized missile having a primer, a firing striker extending axially of the fuze for striking said primer on impact of said missile, the improvement which comprises, a guided rotary member, means guiding said rotary member and having means cooperative with said rotary member for causing said rotary member to move axially between a preselected initial axial position and a second axial position upon rotation of said rotary member in a given direction, a safety member disposed in a safety position transversely of said fuze axis disposed between said primer and striker to preclude striking of said primer by said striker, means mounting said safety member constructed to permit movement of said safety member radially in response to the spin of the missile into a position allowing said striker to engage said primer on impact, said rotary member having means effective for holding said safety member in said safety position when disposed in said preselected axial position and effective to release said safety member when moved to said second axial position upon rotation of said rotary member, a system for rotating said rotary member in said given direction in response to missile spin to cause it to move axially to said second axial position, said system comprising a plurality of alike balls disposed internally of said fuze and radially inwardly of said rotary member, said rotary member having a plurality of radial channels equally spaced angularly, through which said balls are capable of passing through radially outwardly, means guiding the balls spirally radially outwardly in response to missile spin to guide said balls successively into said channels, and means disposed radially outwardly of said channels providing a plurality of surfaces coactive with said rotary member and said balls upon their moving radially outwardly successively through said channels each configured to guide movement of said balls coactive therewith radially outwardly and simultaneously around said axis each a limited angular extent and thereby impart rotational movement to said rotary member in a direction causing said rotary member to rotate and travel axially to said second axial position, the last mentioned means having a radial opening to allow said balls to pass radially outwardly thereof, and means defining a chamber for receiving said bodies after they leave the last mentioned channel.

4. In a mechanical impact fuze for a spin stabilized missile having a primer, a firing striker extending axially of the fuze for striking said primer on impact of said missile, the improvement which comprises, a guided threaded rotary nut, means guiding said rotary nut and having threads cooperative with said rotary nut for causing said rotary nut to move axially between a preselected initial axial position and a second axial position upon rotation of said rotary nut in a given direction, a safety member disposed in a safety position transversely of said fuze axis disposed between said primer and striker to preclude striking of said primer by said striker, means mounting said safety member constructed to permit movement of said safety member radially in response to the spin of the missile into a position allowing said striker to engage said primer on impact, said rotary nut having means effective for holding said safety member in said safety position when disposed in said preselected axial position and effective to release said safety member when moved to said second axial position upon rotation of said rotary nut, a system for rotating said rotary nut in said given direction in response to missile spin to cause it to move axially to said second axial position, said system comprising a plurality of alike balls disposed internally of said fuze and radially inwardly of said rotary nut, said rotary nut having a plurality of radial channels, through which said balls are capable of passing through radially outwardly, means guiding the balls spirally radially outwardly in response to missile spin to guide said balls successively into said channels, and means disposed radially outwardly of said channels providing at least one surface coactive with said rotary nut and said balls upon their moving radially outwardly successively through said channels configured to guide movement of said balls radially outwardly and simultaneously around said axis each a limited angular extent and thereby impart rotational movement to said rotary member in a direction causing said rotary nut to rotate and travel axially to said second axial position, the last mentioned means having a radial opening to allow said balls to pass radially outwardly thereof, and means defining a chamber for receiving said balls after they leave the last mentioned channel.

5. In a mechanical impact fuze for a spin stabilized missile having a primer, a firing striker extending axially of the fuze for striking said primer on impact of said missile, the improvement which comprises, a guided rotary member, means guiding said rotary member and having means cooperative with said rotary member for causing said rotary member to move axially between a preselected initial axial position and a second axial position upon rotation of said rotary member in a given direction, a safety member disposed in a safety position transversely of said fuze axis disposed between said primer and striker to preclude striking of said primer by said striker, means mounting said safety member constructed to permit movement of said safety member radially in response to the spin of the missile into a position allowing said striker to engage said primer on impact, said rotary member having means effective for holding said safety member in said safety position when disposed in said preselected axial position and effective to release said safety member when moved to said second axial position upon rotation of said rotary member, a system for rotating said rotary member in said given direction in response to missile spin to cause it to move axially to said second axial position, said system comprising a plurality of alike balls disposed internally of said fuze and radially inwardly of said rotary member, said rotary member having a plurality of radial channels through which said balls are capable of passing through radially outwardly, means guiding the balls spirally radially outwardly in response to missile spin to guide said balls successively into said channels, and means disposed radially outwardly of said channels providing at least one surface coactive with said rotary member and said balls upon their moving radially outwardly successively through said channel configured to guide movement of said balls radially outwardly and simultaneously around said axis a limited angular extent and thereby impart rotational movement to said rotary member in a direction causing said rotary member to rotate and travel axially to said second axial position, the last mentioned means having a radial opening to allow said balls to pass radially outwardly thereof, and means defining a chamber for receiving said balls after they leave the last mentioned channel.

References Cited in the file of this patent
UNITED STATES PATENTS

| | | |
|---|---|---|
| 2,228,905 | Bold | Jan. 14, 1941 |
| 2,304,106 | Lake | Dec. 8, 1942 |
| 2,814,251 | Kuhn | Nov. 26, 1957 |
| 2,834,292 | Viasmensky | May 13, 1958 |
| 2,895,419 | Rosselet | July 21, 1959 |